US011609576B2

United States Patent
Luo et al.

(10) Patent No.: US 11,609,576 B2
(45) Date of Patent: Mar. 21, 2023

(54) EMERGENCY VEHICLE AUDIO DETECTION

(71) Applicant: Baidu USA LLC, Sunnyvale, CA (US)

(72) Inventors: Qi Luo, Sunnyvale, CA (US); Kecheng Xu, Sunnyvale, CA (US); Jinyun Zhou, Sunnyvale, CA (US); Xiangquan Xiao, Sunnyvale, CA (US); Shuo Huang, Sunnyvale, CA (US); Jiangtao Hu, Sunnyvale, CA (US); Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 476 days.

(21) Appl. No.: 16/704,171

(22) Filed: Dec. 5, 2019

(65) Prior Publication Data

US 2021/0173408 A1 Jun. 10, 2021

(51) Int. Cl.
*G05D 1/02* (2020.01)
*G10L 25/51* (2013.01)
(Continued)

(52) U.S. Cl.
CPC ......... *G05D 1/0255* (2013.01); *G05D 1/0088* (2013.01); *G05D 1/0212* (2013.01);
(Continued)

(58) Field of Classification Search
CPC . B60W 2420/60; B60W 30/09; G08G 1/0965
See application file for complete search history.

(56) References Cited

U.S. PATENT DOCUMENTS

| 4,956,866 A * | 9/1990 | Bernstein ................. B60Q 1/52 |
| | | 704/274 |
| 2017/0213459 A1 * | 7/2017 | Ogaz ....................... G08G 1/166 |

(Continued)

FOREIGN PATENT DOCUMENTS

| DE | 102016120218 A1 * | 4/2017 | ............ B60W 10/04 |
| JP | 2000127796 A * | 5/2000 | |
| JP | 6557845 B1 * | 8/2019 | ............ B60W 10/04 |

OTHER PUBLICATIONS

Scott Russell, John (1848). "On certain effects produced on sound by the rapid motion of the observer". Report of the Eighteenth Meeting of the British Association for the Advancement of Science. John Murray, London in 1849. 18 (7): 37-38. (Year: 1848).*

(Continued)

*Primary Examiner* — Vivek D Koppikar
*Assistant Examiner* — Andrew James Trettel
(74) *Attorney, Agent, or Firm* — Womble Bond Dickinson (US) LLP (57) ABSTRACT

In one embodiment, a process is performed during controlling Autonomous Driving Vehicle (ADV). Microphone signals sense sounds in an environment of the ADV. The microphone signals are combined and filtered to form an audio signal having the sounds sensed in the environment of the ADV. A neural network is applied to the audio signal to detect a presence of an audio signature of an emergency vehicle siren. If the siren is detected, a change in the audio signature to make a determination as to whether the emergency vehicle siren is a) moving towards the ADV, or b) not moving towards the ADV. The ADV can make a driving decision, such as slowing down, stopping, and/or steering to a side, based on if the emergency vehicle siren is moving towards the ADV.

20 Claims, 9 Drawing Sheets

(51) Int. Cl.
*G05D 1/00* (2006.01)
*G10L 25/30* (2013.01)
*B60W 30/09* (2012.01)
*G08G 1/0965* (2006.01)

(52) U.S. Cl.
CPC .............. *G10L 25/30* (2013.01); *G10L 25/51* (2013.01); *B60W 30/09* (2013.01); *B60W 2420/60* (2013.01); *G05D 2201/0213* (2013.01); *G08G 1/0965* (2013.01)

(56) References Cited

U.S. PATENT DOCUMENTS

| | | |
|---|---|---|
| 2018/0046869 A1* | 2/2018 | Cordell .................. G06V 20/56 |
| 2019/0243371 A1* | 8/2019 | Nister .................. G05D 1/0242 |
| 2019/0333381 A1* | 10/2019 | Shalev-Shwartz .......................... B60W 30/0956 |
| 2019/0355247 A1* | 11/2019 | Aist ..................... G08G 1/0965 |

OTHER PUBLICATIONS

Translation of Kobayashi et al. (JP 2000127796 A) from PE2E Search. (Year: 2000).*
Translation of Yamauchi (JP 6557845 B1) from JPlatPat. (Year: 2019).*

* cited by examiner

EMERGENCY VEHICLE AUDIO DETECTION

TECHNICAL FIELD

Embodiments of the present disclosure relate generally to operating autonomous vehicles. More particularly, embodiments of the disclosure relate to detection of an emergency vehicle based on audio.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Emergency vehicles, such as police, ambulance, and fire trucks, use emergency sirens to warn pedestrians and vehicle drivers of an emergency. When the siren is on, pedestrians and vehicle drivers must stay clear of the emergency vehicle and allow the emergency vehicle to pass. Sirens generate loud noises that can be easily heard, recognized, and can travel relatively far.

An autonomous driving vehicle (ADV) must be aware of emergencies, so that the ADV can properly respond. For example, if a fire truck has an emergency siren on, then the ADV should stay out of the fire truck's way. Therefore, it is desirable for an ADV make driving decisions based on audio detection of an emergency siren, so that the ADV can stay out of the fire truck's way during times of emergency.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A system and process can a) detect presence of an emergency vehicle siren in one or microphone signals, and b) determine whether the emergency vehicle siren is approaching the ADV, based on changes in the siren's amplitude or frequency (e.g., through the Doppler effect). If the ADV senses that an emergency vehicle is approaching the ADV (i.e., getting closer), then the ADV can make a driving decision to give the emergency vehicle a clear path.

Figure 1:
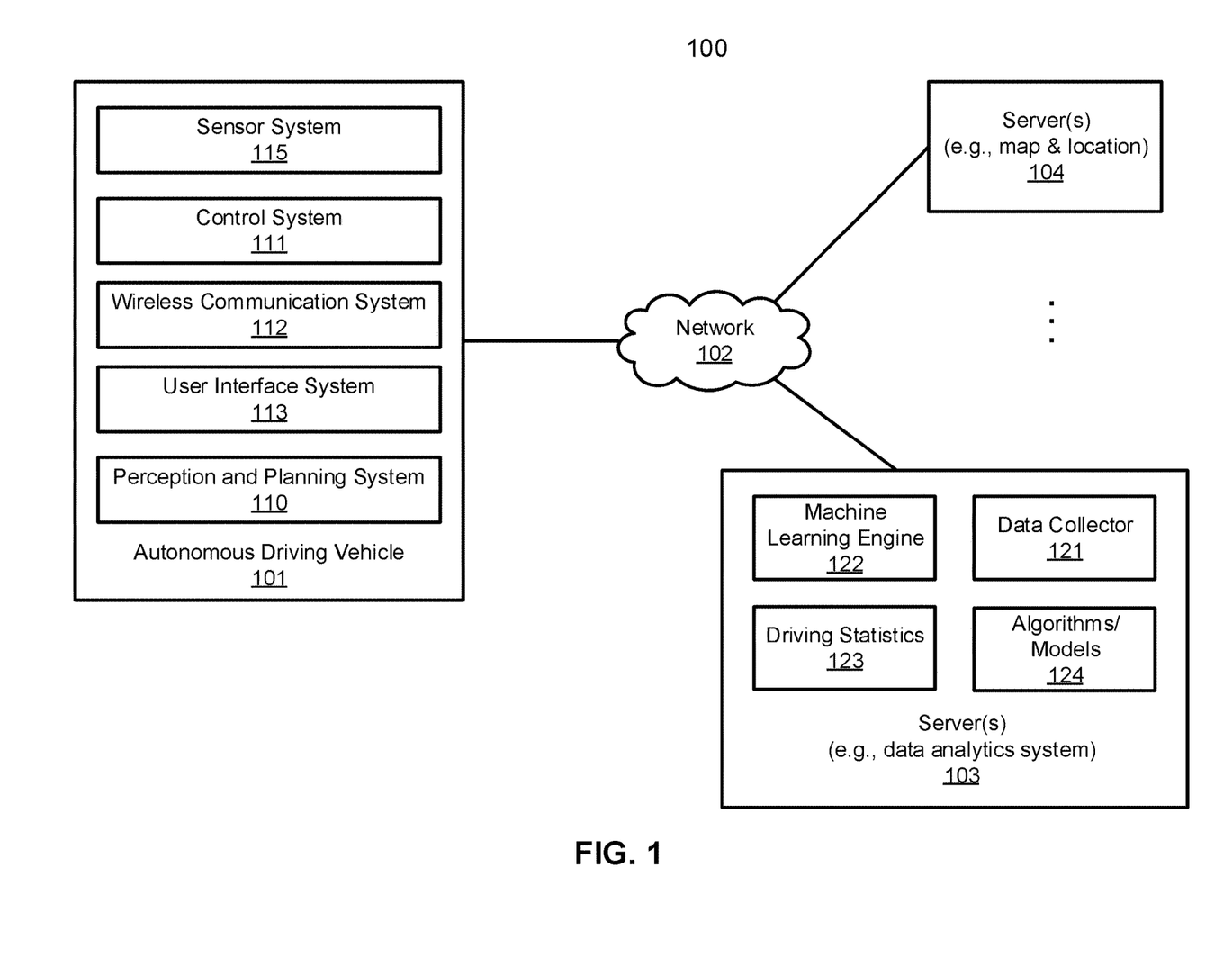
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
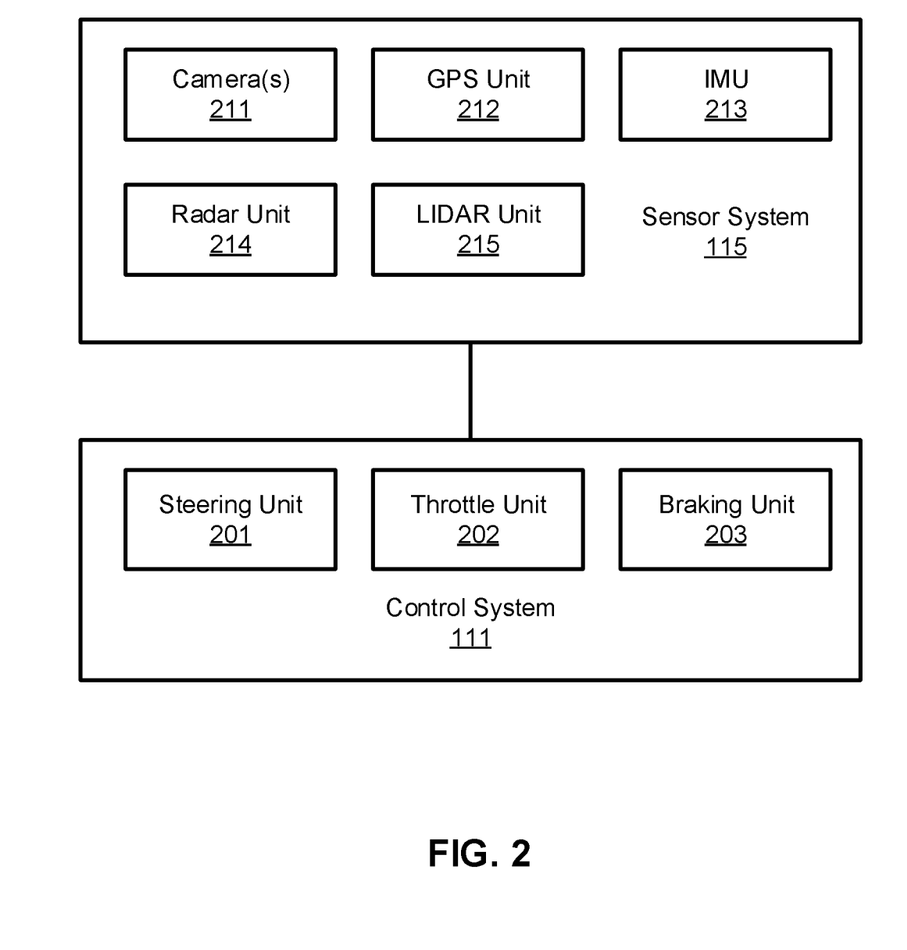
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor. In some embodiments, any combination of the sensors of the sensor system (e.g., the cameras, scanners, and/or detectors) can gather data used to detect obstacles.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using Wi-Fi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
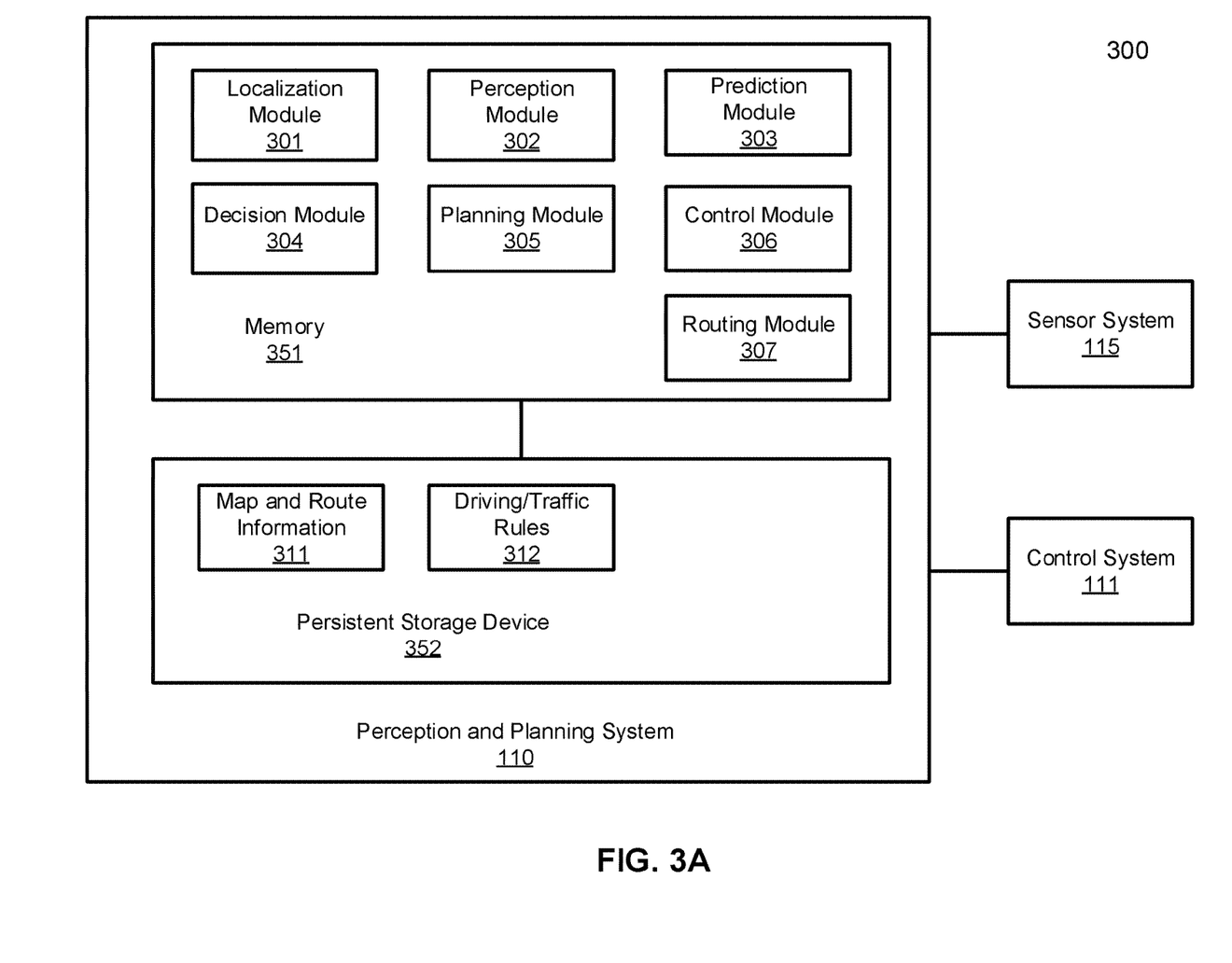
FIGS. 3A-3B are block diagrams illustrating an example of a perception and planning system used with an autonomous vehicle according to one embodiment.
Figure 3B:
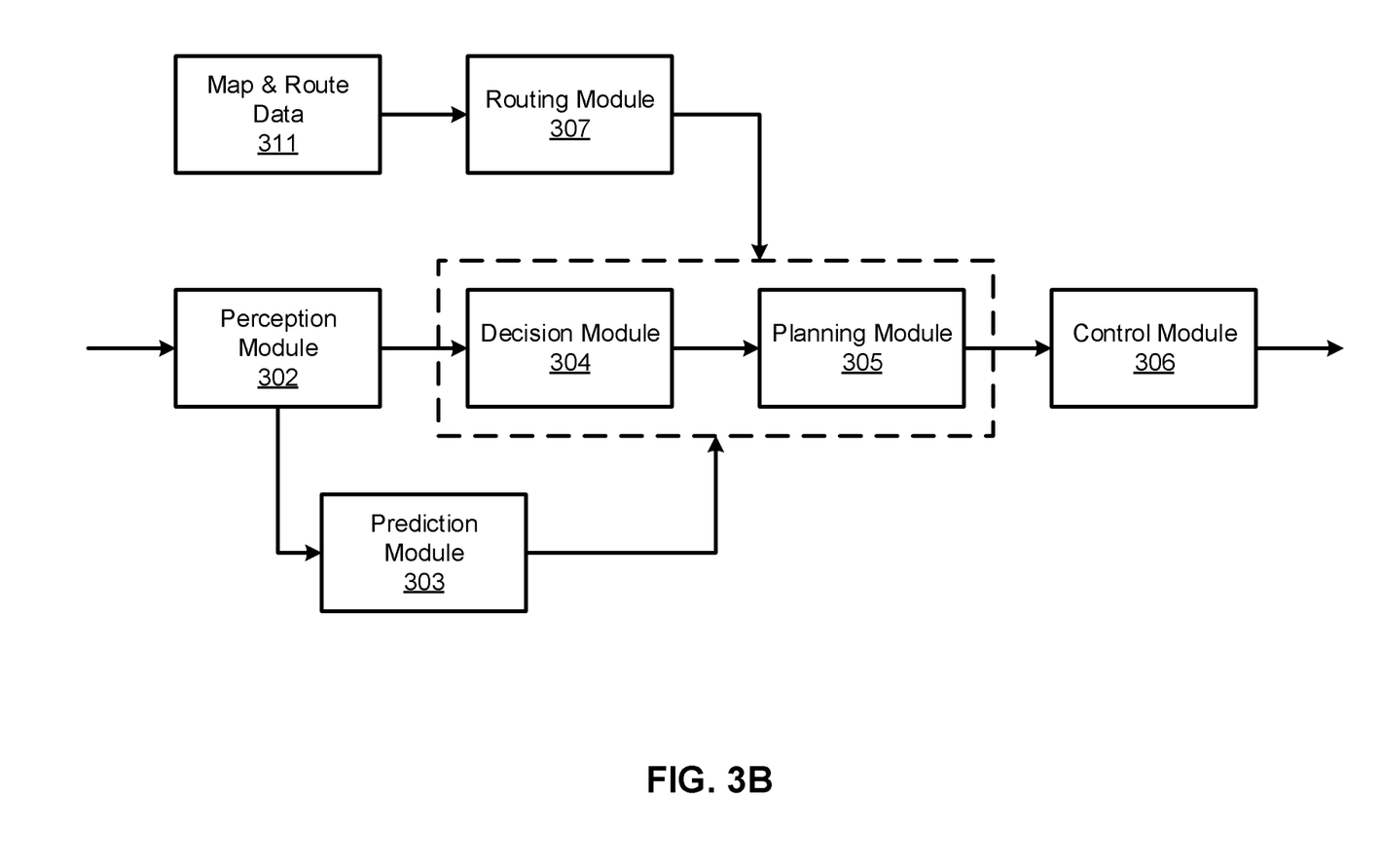

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or other obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts how the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

In some aspects, prediction module generates a predicted trajectory of an obstacle that predicts a path of the moving obstacle, at least in an area that is deemed relevant to a current path of the ADV. The predicted trajectory can be generated based the current status of the moving obstacle (e.g., speed, location, heading, acceleration, or a type of the moving obstacle), map data, and traffic rules.

For example, the ADV may recognize the obstacle as a vehicle (e.g., an emergency vehicle) that is sensed to be traveling in a driving lane based on the obstacle's heading and location that is referenced to map data that contains lane location and orientation that corroborates that the obstacle, based on the heading and location of the obstacle, appears to be driving in the driving lane. Suppose that the map data indicates that this is a right turn only lane. Based on traffic rules (e.g., an obstacle of type 'vehicle' in a right turn only lane must turn right), a trajectory can be generated that defines movement of the obstacle. The trajectory can include coordinates and/or a mathematical representation of a line that predicts the obstacle's movement.

In some embodiments, when predicting a movement trajectory of an obstacle, a prediction system or module divides the trajectory prediction of an obstacle into two parts: 1) a longitudinal movement trajectory generation and 2) a lateral movement trajectory generation. These parts can be combined to form the predicted trajectory of the obstacle.

In some embodiments, the lateral movement trajectory (also simply referred to as a lateral trajectory) is generated including optimizing the trajectory using a first polynomial function. The longitudinal movement trajectory (also simply referred to as a longitudinal trajectory) is generated including optimizing the trajectory using a second polynomial function. The optimizations are performed based on a) current states of the obstacle as initial states and b) predicted end states of the obstacle as a set of constraints, such that the trajectories are smoothly aligned with at least a current heading direction of the obstacle. The end states are determined in view of the shape of a lane which the obstacle is predicted to move onto. Once the longitudinal movement trajectory and the lateral movement trajectory have been defined and generated, a final predicted trajectory for the obstacle can be determined by combining the longitudinal movement trajectory and the lateral movement trajectory. As a result, the predicted trajectory of the obstacle is more accurate based on the current states of the obstacle and the shape of the lane.

A polynomial optimization or polynomial fit refers to the optimization of the shape of a curve (for example, a trajectory of an obstacle) represented by a polynomial function (e.g., quintic or quartic polynomial functions), such that the curve is continuous along the curve (e.g., a derivative at the joint of two adjacent segments is obtainable). In the field of autonomous driving, the polynomial curve from a starting point to an end point is divided into a number of segments (or pieces), each segment corresponding to a control point (or reference point). Such a segmented polynomial curve is referred to as a piecewise polynomial. When optimizing the piecewise polynomial, a set of joint constraints and a set of boundary constraints between two adjacent segments have to be satisfied, in addition to the set of initial state constraints and end state constraints.

The set of joint constraints includes positions (x, y), speed, heading direction, and acceleration of the adjacent segments have to be identical. For example, the ending position of a first segment (e.g., leading segment) and the starting position of a second segment (e.g., following segment) have to be identical or within a predetermined proximity. The speed, heading direction, and acceleration of the ending position of the first segment and the corresponding speed, heading direction, and acceleration of the starting position of the second segment have to be identical or within a predetermined range. In addition, each control point is associated with a predefined boundary (e.g., 0.2 meters left and right surrounding the control point). The polynomial curve has to go through each control point within its corresponding boundary. When these two set of constraints are satisfied during the optimization, the polynomial curve representing a trajectory should be smooth and continuous.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follow the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/ path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
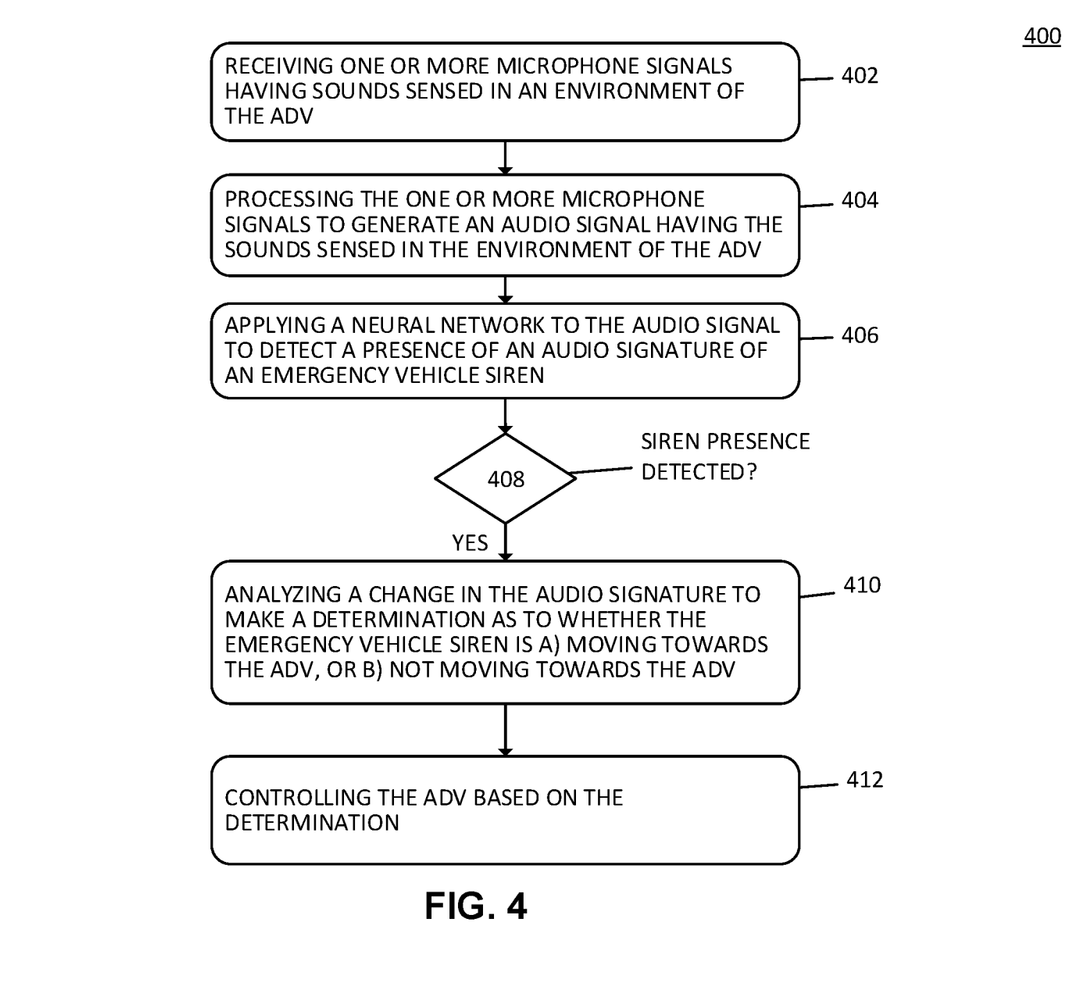
FIG. 4 shows a process for detecting an emergency vehicle siren according to some embodiments.

In FIG. 4, a process 400 is shown that can be performed during driving of an autonomous driving vehicle (ADV), to make driving decisions for the ADV based on whether or not emergency vehicle siren (e.g., police sirens, ambulance, and fire trucks) is heard to be approaching the ADV. The process can be repeated periodically, for example, every driving cycle, or every multiple driving cycles, or every planning cycle. The process can override other vehicle planning decisions above, until it is determined that the emergency vehicle siren is no longer approaching the ADV. At that point, the ADV can resume normal planning based on destination, obstacle detection, etc., as described in other sections.

At block 402, the process includes receiving one or more microphone signals having sounds sensed in an environment of the ADV. The microphone signals can be generated by microphones that are integral to the ADV and arranged to sense sounds in the environment of the ADV. In some embodiments, the one or more microphones can be arranged on an exterior of the ADV, or in a manner so that ambient sound external to the ADV can be sensed by the microphones.

At block 404, the process includes processing the one or more microphone signals to generate an audio signal having the sounds sensed in the environment of the ADV. Such audio processing can include combining the microphone signals and filtering the resulting combined signal, as further described in other sections.

At block 406, the process includes applying a neural network to the audio signal to detect a presence of an audio signature of an emergency vehicle siren. The neural network can be trained with audio training data (e.g., prior to deployment of the ADV). Training data can include a) audio data that is classified as having an emergency vehicle siren, and b) audio data that is classified as not having an emergency vehicle siren. For example, training data can include numerous audio samples, some of which contain different police sirens, fire truck sirens, and ambulance sirens that are classified as having an emergency vehicle siren, and some of which containing other noises such as, but not limited to, dogs barking, birds chirping, cars honking, music, etc., that are classified as not having an emergency vehicle siren.

In some embodiments, the neural network is a convolutional neural network, although other neural networks can also be used without departing from the scope of the invention. Similarly, the neural network can have a depth N (e.g., 1, 2, 3, or more) that is capable of being determined through routine test and experimentation. The neural network can be trained with known techniques such as, for example, linear regression, minimizing a loss function (also known as a cost function) such as mean squared error (MSE) or linear least squares, gradient descent, and/or other known training techniques.

At decision block 408 the process will proceed to block 410 if the siren (e.g., an audio signature of the emergency vehicle siren) is detected by the neural network algorithm. If not detected, then the process can do nothing, meaning that driving decisions of the ADV will not be influenced by this process in the current driving cycle.

At block 410, in response to detecting the presence of the audio signature, the process can analyze a change in the audio signature to make a determination as to whether the emergency vehicle siren is a) moving towards the ADV, or b) not moving towards the ADV. In some embodiments, the analysis can include detecting a change in amplitude, frequency (also known as pitch), of the audio signature from one time frame of the audio signal to another time frame of the audio signal.

For example, an increase in the amplitude and/or frequency of the siren, with respect to time, can indicate that the emergency vehicle siren is moving towards the ADV. In some embodiments, the microphone signals can be analyzed to determine phase shifts of the audio signature from one microphone signal to another microphone signal, which can also indicate a direction of the siren and whether the siren is approaching the ADV.

At block 412, the process can control the ADV based on the determination. For example, if the emergency vehicle siren is moving towards the ADV, then the process can generate a driving decision that steers the ADV out of a current driving lane, accelerates or decelerates the ADV, and/or brakes the ADV to slow down or stop. The driving decision can be affected through a series of control commands that activate throttle, brakes, and/or steering.

Figure 5:
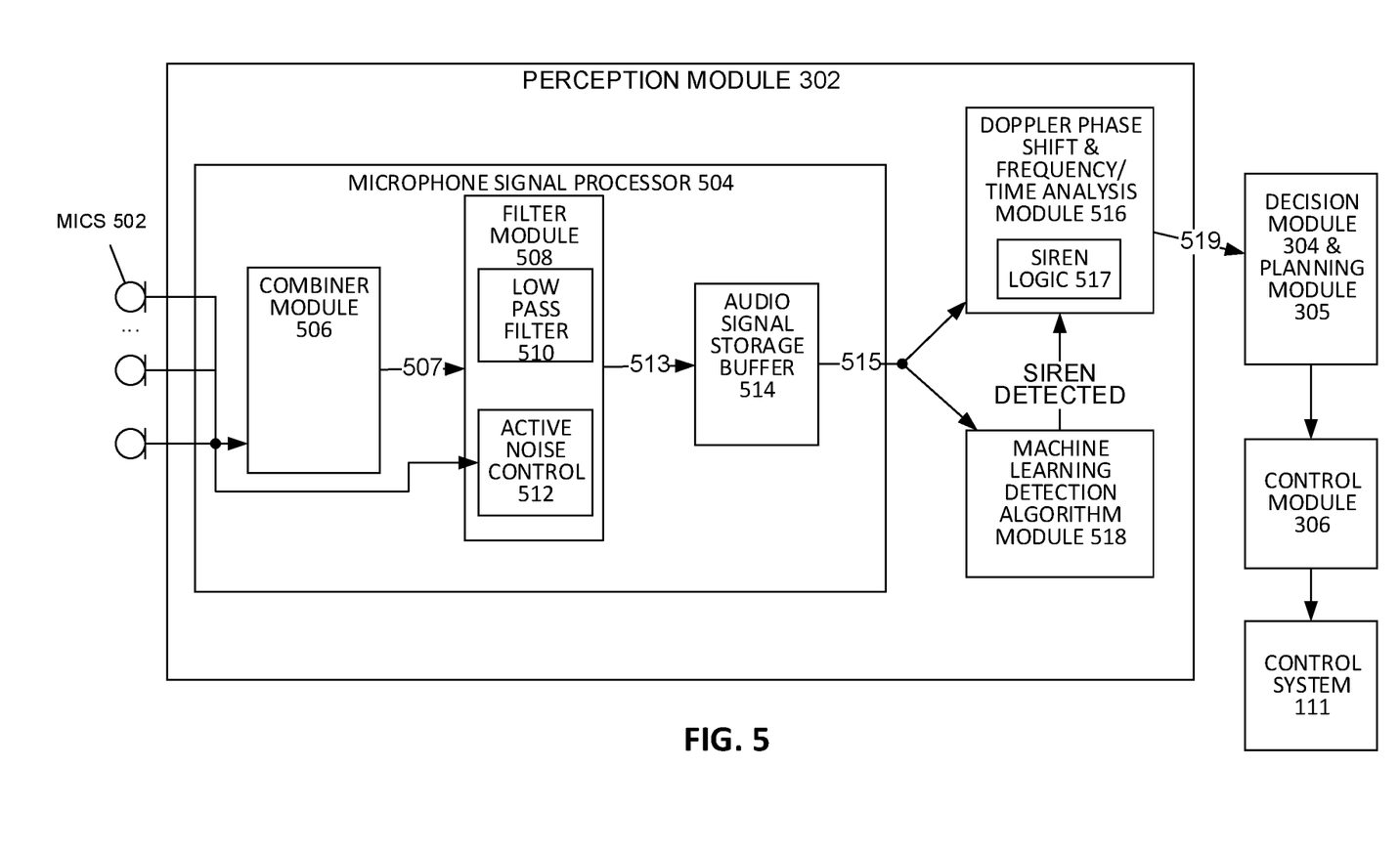
FIG. 5 shows a block diagram illustrating a system for detecting an emergency vehicle siren according to some embodiments.

Referring to FIG. 5, an ADV system is shown that can detect and respond to an approaching siren. One or more microphones 502 can sense sound in the environment of the ADV. The microphones form a microphone array having fixed and known positions on the ADV, arranged to sense sounds in a plurality of directions around the ADV.

A microphone signal processor 504 can process the microphone signals to produce an audio signal 515 for consumption by machine learning algorithm module 518 and Doppler phase shift and frequency/time analysis module 516. The microphone signal processor includes a combiner module 506 that combines the microphone signals into a combined microphone signal 507. This can be done, for example, through averaging the microphone signals. The combiner can use feature extraction to determine key points for the microphone signals to align, so that they can be properly combined. Other combining or down mixing techniques can be utilized by the combiner to combine the microphone signals into a single audio signal without departing from the scope of the disclosure.

The microphone signal processor includes a filter 508 that removes noise components from the combined microphone signal 507. For example, a low pass filter 510 can attenuate high frequency audio components. Additionally or alternatively, active noise control module 512 can actively remove noise from the high frequency audio components.

For example, active noise control can analyze waveforms of the microphone signals to determine background noise in the ADV's environment. This noise can include noise generated by the ADV, or other ambient noise such engines of other vehicles, music, wind, etc. An anti-noise signal can be generated that, when applied to the combined microphone signal, cancels the noise in the combined microphone signal. The anti-noise signal can be a phase shifted or inverted version of detected noise (which can be detected in the microphone signals or the combined microphone signal). In some embodiments, one or more of the microphone signals can be used as a noise reference signal. Known adaptive algorithms can analyze the noise reference signal to determine noise which is to be canceled in the combined microphone signals. This noise can then be inverted, so that when it is applied to the combined microphone signal, creates destructive interference that removes noise in the audio signal so that the siren can be more effectively recognized in the audio signal.

The filtered audio signal 513 resulting from filtering the combined microphone signal can be output by filter module and fed to an audio signal storage buffer 154. The audio signal storage buffer can store the audio signal as a plurality of time frames prior to applying the neural network to the audio signal (at module 518) and analyzing the change in the audio signature (at block 516).

Figure 6:
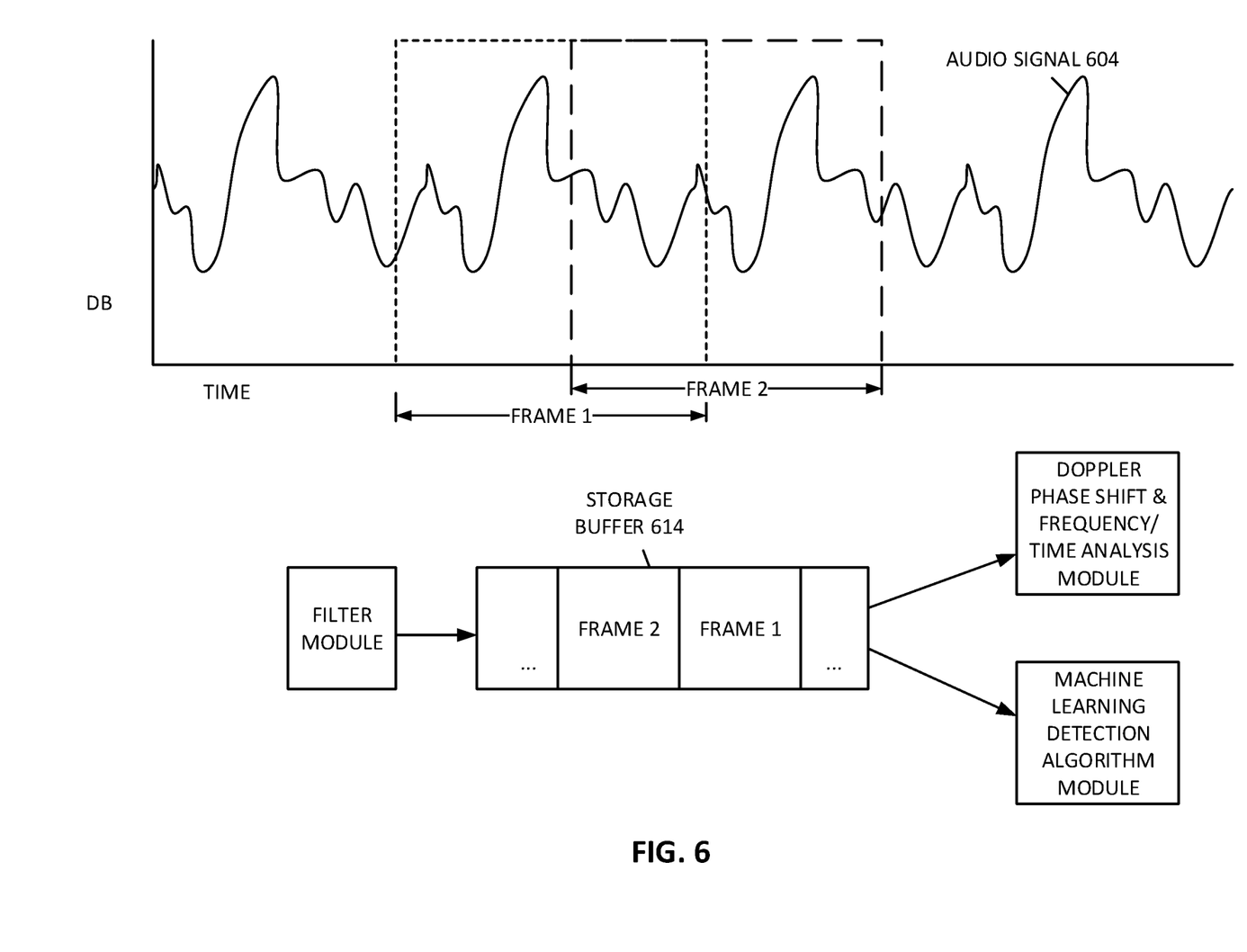
FIG. 6 shows an example of buffering an audio signal according to some embodiments.

For example, referring to FIG. 6, a plurality of audio frames (e.g., frame 1 and frame 2) can be extracted from the audio signal 604. Each audio frame can overlap over adjacent audio frames, although not necessarily. Frame size can vary (e.g., 0.5 second, 1 second, 3 seconds) based on application and can be tailored to application through routine test and experimentation. Each frame can be stored in storage buffer 614. The Doppler phase shift and frequency/time analysis module and machine learning detection algorithm module can consume each frame from the storage buffer (e.g., on a frame-by-frame basis), as the storage buffer is populated with filtered audio from the filter module. Thus, the storage buffer acts as a pipeline to provide continuous audio data for processing by the modules.

Referring back to FIG. 5, machine learning detection algorithm module 518 applies a neural network algorithm to audio signal 515 to determine if an audio signature of an emergency siren is present in the audio signal. As mentioned, the audio signal can be a series of audio frames. Thus, the neural network algorithm can analyze a series of audio frames to determine if the audio signature of the emergency siren is present.

If so, then the Doppler phase shift and frequency/time analysis module 516 can be notified that a siren is detected. In response to this notification, the Doppler phase shift and frequency/time analysis module 516 can analyze the audio signal 515 to approximate, based on Doppler effect, if the emergency vehicle siren (and, consequently, the emergency vehicle) is moving towards the ADV. For example, if the frequency of the emergency siren (e.g., from 1 Hz to 1.1 Hz) increases over time (e.g., from one time frame to another time frame), then this can indicate that the emergency vehicle is moving towards the ADV, based on the Doppler effect. In such a case, the ADV should stop or pullover. Other indications can include increasing loudness of the sirens, or a phase shift in the siren from one microphone signal to another microphone signal. The time frames can be analyzed in the time domain and/or in the frequency domain.

In some embodiments, siren logic 517 can also analyze the ADV's movement to help determine if the emergency siren is approaching the ADV or not. For example, siren logic 517 can check the ADV speed. If ADV speed is zero, and the amplitude and frequency of the siren remain the same over time, then the siren logic 517 can form a determination that the emergency vehicle and siren are stationary. In another example, if the ADV is moving, and the amplitude and frequency of the siren remain constant (or substantially constant) over time, siren logic require more data to form a determination. For example, the ADV may analyze camera data to determine where the emergency vehicle is and whether or not the emergency vehicle is approaching the ADV.

A determination 519 can be indicated to decision module 304 (as described in other sections) and/or planning module 305. The determination can be one of "approaching", "not approaching". The decision module and/or planning module can then make a driving decision (e.g., slow down, change lanes, stop) based on the determination. The driving decision can be affected through a series of control commands (throttle, brake, steering) issued from control module 306 to the vehicle control system 111. In some embodiments, a driving decision will be made only when the determination is that the emergency vehicle is approaching the ADV. Thus, the ADV can ignore sirens that are not approaching and prevent unnecessary disturbances to the drive.

Figure 7:
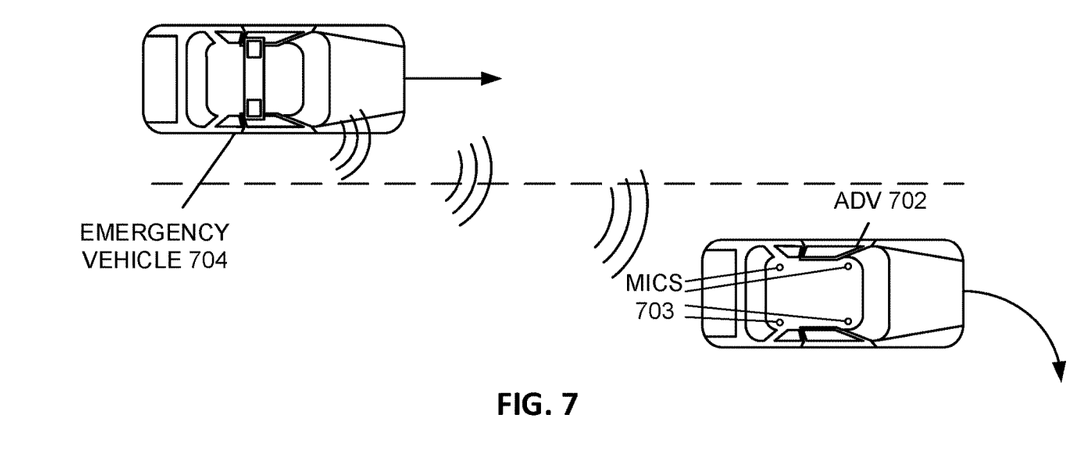
FIGS. 7-10 illustrate examples of an ADV interacting with an emergency vehicle.

FIGS. 7 through 10 further illustrate different non-exhaustive scenarios in which an ADV detects and responds to an emergency vehicle siren by performing a process such as that described in FIG. 4. In FIG. 7, an emergency vehicle 704 is approaching ADV 702. ADV 702 has one or more microphones 703 that sense sounds in the ADV's environment. Once the ADV determines that the emergency vehicle 704 is approaching the ADV (e.g., from behind, as shown), the ADV can make implement a driving decision, such as slowing down, braking, and/or steering to the side of the road.

Figure 8:
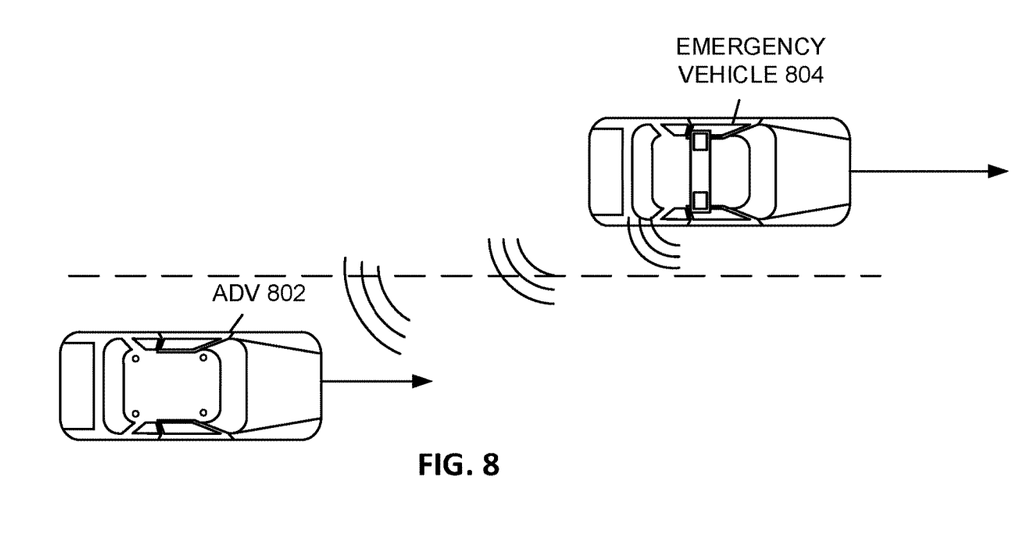

FIG. 8 shows a scenario where emergency vehicle 804 is moving away from the ADV 802. In such a case, the ADV can detect that the emergency vehicle siren is moving away from the ADV, and the ADV can continue along its current path without disturbance.

Figure 9:
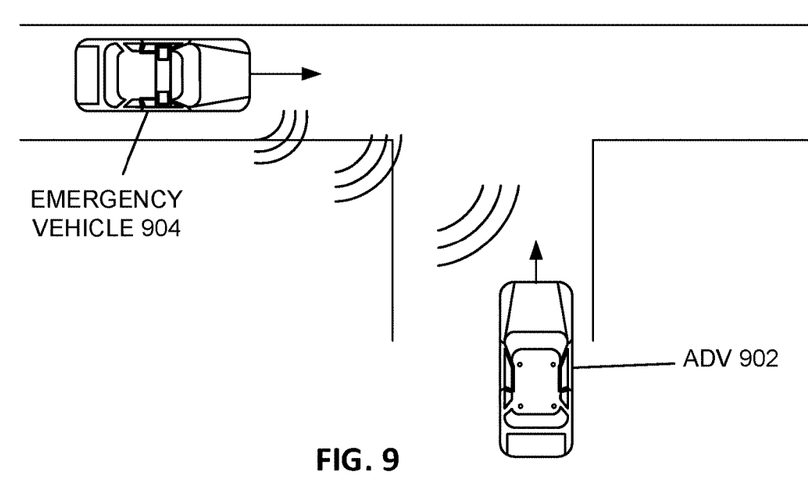
Figure 10:
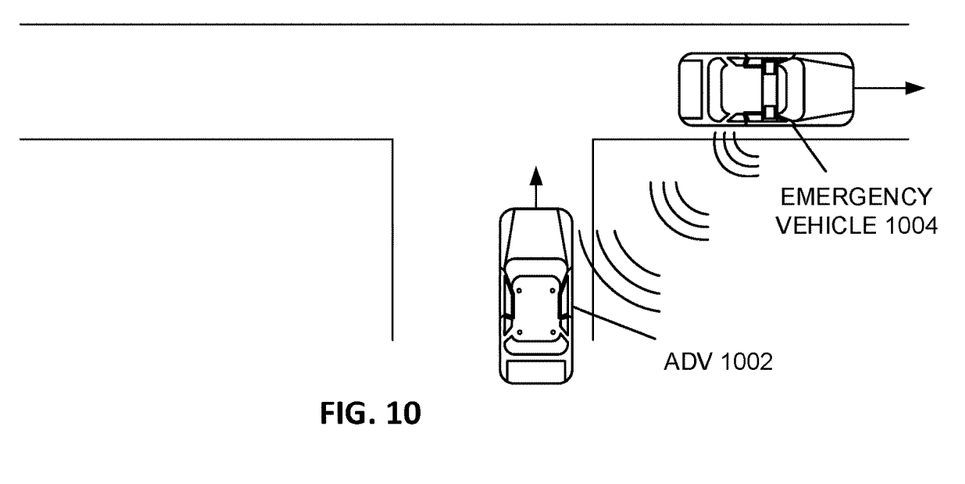

FIGS. 9 and 10 illustrate a scenario where the emergency vehicle and the ADV are on the same path. Vehicles on the road must respond to emergency vehicles even if the emergency vehicle is not on the same road or path, because the non-emergency vehicles must yield to give emergency vehicles priority in selecting a driving path. In FIG. 9, the ADV 902 is driving towards an intersection and senses an approaching emergency vehicle 904 based on the emergency vehicle's siren. The ADV can respond by slowing down, braking, and/or pulling over, so that the emergency vehicle can have priority in selecting a path (straight or turn) and be assured that the ADV will not obstruct the emergency vehicle. In FIG. 10, however, when the emergency vehicle 1004 is determined to be driving away from ADV 1002, then the ADV can safely proceed along the ADV's path, without further consideration of the emergency vehicle.

It should be understood that examples discussed in FIGS. 7-10 are meant to be illustrative rather than limiting. Numerous scenarios can be described that involve an ADV and detecting whether an emergency vehicle is approaching, all of which cannot be practically illustrated in the present disclosure.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

The invention claimed is:

1. A computer-implemented method of operating an autonomous driving vehicle (ADV), method comprising:
    capturing a stream of audio signals using one or more audio capturing devices mounted on the ADV, the stream of audio signals representing an audible environment surrounding the ADV;
    storing the stream of audio signals in a buffer;
    applying a neural network to at least a portion of the stream of audio signals received from the buffer, to detect an emergency vehicle siren signal;
    in response to detecting the emergency vehicle siren signal by the neural network, performing an audio analysis on the stream of audio signals received from the buffer to determine whether an emergency vehicle is moving towards the ADV or moving away from the ADV, including in response to when the ADV is moving and an amplitude and a frequency of the emergency vehicle siren signal is constant, analyzing camera data to determine whether the emergency vehicle is moving towards the ADV or moving away from the ADV;
    planning a trajectory to control the ADV based on determination of whether the emergency vehicle is moving towards or moving away from the ADV, including ignoring the emergency vehicle in response to determining that the emergency vehicle is moving away;
    generating a control command that includes a throttle command, a brake command, or a steering command, based on the trajectory; and
    applying the throttle command, the brake command, or the steering command to a throttle, a brake, or a steering unit of the ADV, respectively, resulting in a movement of the ADV according to the trajectory.

2. The method of claim 1, further comprising controlling the ADV including at least one of steering the ADV out of a current driving lane or braking the ADV to decelerate, in response to determining that the emergency vehicle is moving towards the ADV.

3. The method of claim 1, wherein performing the audio analysis on the at least a portion of the stream of audio signals comprises detecting a change in at least one of an amplitude or a frequency of an audio pattern across a plurality of audio frames of the audio signals.

4. The method of claim 3, further comprising determining that the emergency vehicle siren signal is moving towards the ADV, in response to detecting an increase in the amplitude or the frequency.

5. The method of claim 1, further comprising performing a digital signal processing (DSP) operation on the audio signals to remove noise.

6. The method of claim 1, further comprising filtering the stream of audio signals to remove noise prior to storing the stream of audio signals as a plurality of audio frames in the buffer.

7. The method of claim 1, wherein the neural network is a convolutional neural network that is trained with audio data representing emergency vehicle siren collected from a plurality of emergency vehicles.

8. The method of claim 1, wherein performing the audio analysis on the at least a portion of the stream of audio signals to determine whether an emergency vehicle is moving towards the ADV or moving away from the ADV includes analyzing changes in an amplitude and frequency of an audio pattern across a plurality of audio frames of the audio signals with respect to a movement of the ADV.

9. A non-transitory machine-readable medium having instructions stored therein, which when executed by a processor, cause the processor to perform operations of operating an autonomous driving vehicle (ADV), the operations comprising:
    capturing a stream of audio signals using one or more audio capturing devices mounted on the ADV, the stream of audio signals representing an audible environment surrounding the ADV;
    storing the stream of audio signals in a buffer;
    applying a neural network to at least a portion of the stream of audio signals received from the buffer to detect an emergency vehicle siren signal;
    in response to detecting the emergency vehicle siren signal, performing an audio analysis on the stream of audio signals received from buffer to determine whether an emergency vehicle is moving towards the ADV or moving away from the ADV, including in response to when the ADV is moving and an amplitude and a frequency of the emergency vehicle siren signal is constant, analyzing camera data to determine whether the emergency vehicle is moving towards the ADV or moving away from the ADV;
    planning a trajectory to control the ADV based on determination of whether the emergency vehicle is moving towards or moving away from the ADV, including ignoring the emergency vehicle in response to determining that the emergency vehicle is moving away;
    generating a control command that includes a throttle command, a brake command, or a steering command based on the trajectory; and
    applying the throttle command, the brake command, or the steering command to a throttle, a brake, or a steering unit of the ADV, respectively, resulting in a movement of the ADV according to the trajectory.

10. The machine-readable medium of claim 9, wherein the operations further comprise controlling the ADV including at least one of steering the ADV out of a current driving lane or braking the ADV to decelerate, in response to determining that the emergency vehicle is moving towards the ADV.

11. The machine-readable medium of claim 9, wherein performing the audio analysis on the at least a portion of the stream of audio signals comprises detecting a change in at least one of an amplitude or a frequency of an audio pattern across a plurality of audio frames of the audio signals.

12. The machine-readable medium of claim 11, wherein the operations further comprise determining that the emergency vehicle siren signal is moving towards the ADV, in response to detecting an increase in the amplitude or the frequency.

13. The machine-readable medium of claim 9, wherein the operations further comprise performing a digital signal processing (DSP) operation on the audio signals to remove noise.

14. The machine-readable medium of claim 9, further comprising filtering the stream of audio signals to remove noise prior to storing the stream of audio signals as a plurality of audio frames in the buffer.

15. The machine-readable medium of claim 9, wherein the neural network is a convolutional neural network that is trained with audio data representing emergency vehicle siren collected from a plurality of emergency vehicles.

16. The machine-readable medium of claim 9, wherein performing the audio analysis on the at least a portion of the stream of audio signals to determine whether an emergency vehicle is moving towards the ADV or moving away from the ADV includes analyzing changes in an amplitude and frequency of an audio pattern across a plurality of audio frames of the audio signals with respect to a movement of the ADV.

17. A data processing system, comprising:
a processor; and
a memory coupled to the processor to store instructions, which when executed by the processor, cause the processor to perform operations of operating an autonomous driving vehicle (ADV), the operations comprising:
  capturing a stream of audio signals using one or more audio capturing devices mounted on the ADV, the stream of audio signals representing an audible environment surrounding the ADV,
  storing the stream of audio signals in a buffer;
  applying a neural network to at least a portion of the stream of audio signals received from the buffer, to detect an emergency vehicle siren signal,
  in response to detecting the emergency vehicle siren signal by the neural network, performing an audio analysis on the stream of audio signals received from the buffer to determine whether an emergency vehicle is moving towards the ADV or moving away from the ADV, including in response to when the ADV is moving and an amplitude and a frequency of the emergency vehicle siren signal is constant, analyzing camera data to determine whether the emergency vehicle is moving towards the ADV or moving away from the ADV,
  planning a trajectory to control the ADV based on determination of whether the emergency vehicle is moving towards or moving away from the ADV, including ignoring the emergency vehicle in response to determining that the emergency vehicle is moving away,
  generating a control command that includes a throttle command, a brake command, or a steering command based on the trajectory; and
  applying the throttle command, the brake command, or the steering command to a throttle, a brake, or a steering unit of the ADV, respectively, resulting in a movement of the ADV according to the trajectory.

18. The system of claim 17, wherein the operations further comprise controlling the ADV including at least one of steering the ADV out of a current driving lane or braking the ADV to decelerate, in response to determining that the emergency vehicle is moving towards the ADV.

19. The system of claim 17, wherein performing the audio analysis on the at least a portion of the stream of audio signals comprises detecting a change in at least one of an amplitude or a frequency of an audio pattern across a plurality of audio frames of the audio signals.

20. The system of claim 19, wherein the operations further comprise determining that the emergency vehicle siren signal is moving towards the ADV, in response to detecting an increase in the amplitude or the frequency.

* * * * *